US009554367B1

(12) United States Patent
Liu et al.

(10) Patent No.: US 9,554,367 B1
(45) Date of Patent: Jan. 24, 2017

(54) SYSTEMS AND METHODS FOR DETERMINING AN ACCESS NODE FOR A WIRELESS DEVICE

(71) Applicant: Sprint Spectrum LP, Overland Park, KS (US)

(72) Inventors: Chunmei Liu, Great Falls, VA (US); Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 101 days.

(21) Appl. No.: 14/269,396

(22) Filed: May 5, 2014

(51) Int. Cl.
*H04J 1/16* (2006.01)
*H04W 72/04* (2009.01)
*H04W 36/16* (2009.01)

(52) U.S. Cl.
CPC ......... *H04W 72/0406* (2013.01); *H04W 36/16* (2013.01)

(58) Field of Classification Search
CPC ............ H04W 72/0406; H04W 36/16; H04W 72/0413; H04W 72/042; H04W 72/08; H04W 72/085; H04W 72/087; H04W 36/18; H04W 36/24; H04W 36/30; H04W 36/36; H04W 36/38
See application file for complete search history.

(56) References Cited

U.S. PATENT DOCUMENTS

| 5,926,470 | A * | 7/1999 | Tiedemann, Jr. ...... | H04B 7/022 370/334 |
| 5,937,019 | A * | 8/1999 | Padovani ............... | H04W 36/30 375/358 |
| 7,039,441 | B1 * | 5/2006 | Reudink ............... | H04B 7/0491 455/277.1 |
| 8,489,029 | B2 | 7/2013 | Siomina et al. | |
| 9,271,212 | B1 * | 2/2016 | Hou ....................... | H04W 36/22 |
| 9,374,742 | B1 * | 6/2016 | Malreddy ......... | H04W 36/0022 |
| 2002/0068566 | A1 * | 6/2002 | Ohlsson ................ | H04W 36/18 455/436 |
| 2002/0068571 | A1 * | 6/2002 | Ohlsson ................ | H04W 36/18 455/442 |
| 2004/0102158 | A1 * | 5/2004 | Schwarz ............... | H04W 36/30 455/67.11 |
| 2004/0242257 | A1 * | 12/2004 | Valkealahti ........... | H04W 16/06 455/522 |

(Continued)

Primary Examiner — Kevin Mew

(57) ABSTRACT

Systems and methods are described for determining an access node for a wireless device. An increased signal level for a first signal and an adjustment value based on the increased signal level may be determined. An indication of the adjustment value and the first signal may be transmitted from a first access node. A wireless device in communication with the first access node may transmit signal information comprising a first signal level associated with the first access node and a second signal level associated with a second access node, where the signal information is transmitted in response to a reporting event triggered at the wireless device based on the adjustment value and at least one of a received signal level for the first signal and a received signal level for the second signal. Based on the signal information, one of the first access node and the second access node may be selected for communication with the wireless device. The wireless device may be instructed to communicate with the selected access node.

20 Claims, 12 Drawing Sheets

(56) References Cited

U.S. PATENT DOCUMENTS

| | | | | |
|---|---|---|---|---|
| 2009/0097451 A1* | 4/2009 | Gogic | H04W 36/30 | 370/331 |
| 2009/0275337 A1* | 11/2009 | Maeda | H04W 36/18 | 455/442 |
| 2010/0002654 A1* | 1/2010 | Lindoff | H04W 52/40 | 370/332 |
| 2010/0142486 A1* | 6/2010 | Wahlqvist | H04W 36/0005 | 370/332 |
| 2011/0003606 A1* | 1/2011 | Forenza | H04L 25/03343 | 455/501 |
| 2011/0116395 A1* | 5/2011 | Tsuda | H04W 28/18 | 370/252 |
| 2011/0255514 A1* | 10/2011 | Olofsson | H04W 72/0426 | 370/331 |
| 2012/0039287 A1 | 2/2012 | Ko et al. | | |
| 2012/0142392 A1* | 6/2012 | Patel | H04W 52/143 | 455/522 |
| 2012/0195241 A1* | 8/2012 | Liu | H04W 52/50 | 370/311 |
| 2012/0214541 A1* | 8/2012 | Narasimha | H04L 5/001 | 455/525 |
| 2012/0258718 A1* | 10/2012 | Whinnett | H04W 36/04 | 455/437 |
| 2012/0322497 A1* | 12/2012 | Navda | H04W 36/0083 | 455/525 |
| 2013/0028107 A1* | 1/2013 | Ho | H04W 24/02 | 370/252 |
| 2013/0223391 A1* | 8/2013 | Koo | H04W 72/0406 | 370/329 |
| 2013/0301434 A1 | 11/2013 | Krishnamurthy et al. | | |
| 2014/0248880 A1* | 9/2014 | Patini | H04W 36/22 | 455/436 |
| 2015/0036663 A1* | 2/2015 | Kilpatrick, II | H04W 36/0083 | 370/332 |

* cited by examiner

SYSTEMS AND METHODS FOR DETERMINING AN ACCESS NODE FOR A WIRELESS DEVICE

TECHNICAL BACKGROUND

Telecommunication systems, such as cellular networks or other wireless networks, use wireless signals to establish communication channels between various network devices. For example, an access node may transmit a reference signal or a pilot signal over a signal radius, and one or more wireless devices within the signal radius may attempt to establish a connection with the access node based on the reference signal.

In certain circumstances, it may be advantageous to boost or to increase the power of the reference signal transmitted from an access node. For example, where a wireless device uses a reference signal for channel estimation, increasing the reference signal strength can improve channel quality. Accordingly, power boosting may be performed at an access node such that the signal level of a reference signal, or pilot signal, transmitted by the access node is increased.

OVERVIEW

Systems and methods are described for determining an access node for a wireless device. An increased signal level for a first signal from a first access node may be determined, and an adjustment value based on the increased signal level may also be determined. An indication of the adjustment value and the first signal comprising the increased signal level may be transmitted from the first access node. Signal information comprising a determined first signal level associated with the first access node and a determined second signal level associated with a second access node may be received from a wireless device in communication with the first access node, wherein the signal information is transmitted from the wireless device in response to a reporting event triggered at the wireless device based on the adjustment value and at least one of a received signal level for the first signal and a received signal level for the second signal. Based on the signal information, one of the first access node and the second access node may be selected for communication with the wireless device. The wireless device may be instructed to communicate with the selected access node.

DETAILED DESCRIPTION

Figure 1:
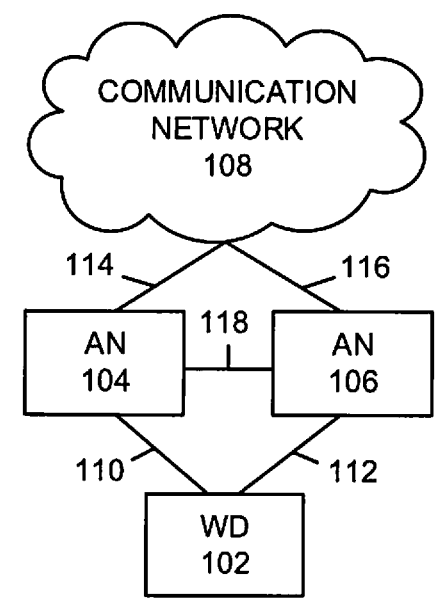
FIG. 1 illustrates an exemplary communication system to determine an access node for a wireless device.

FIG. 1 illustrates an exemplary communication system 100 to determining an access node for a wireless device comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless devices 102 can be in communication with a plurality of access node. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE. Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
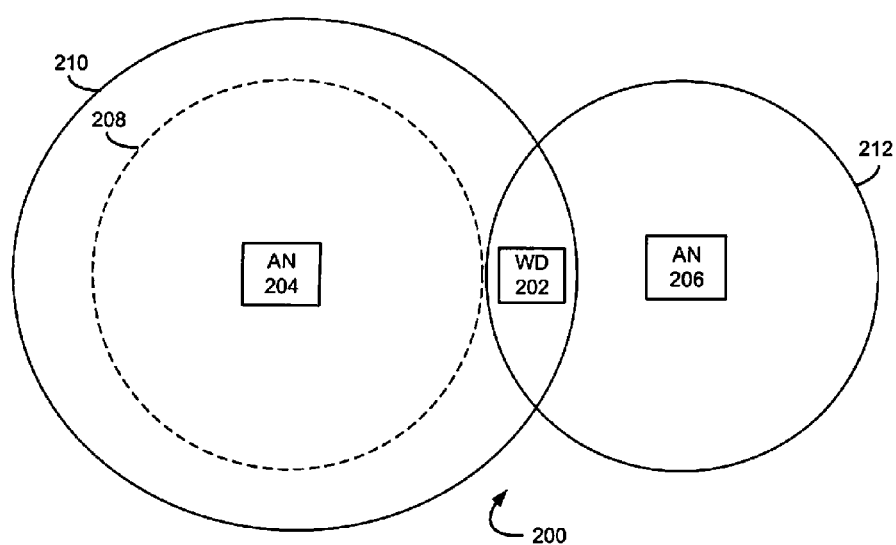
FIG. 2 illustrates another exemplary system to determine an access node for a wireless device.

FIG. 2 illustrates an exemplary communication system 200 for determining an access node for a wireless device. System 200 comprises wireless device 202, access nodes 204 and 206, and signal radii 208, 210, and 212. Wireless device 202 may comprise a device similar to wireless device 102 of FIG. 1. Similarly, access nodes 204 and 206 may comprise access nodes similar to access node 104 of FIG. 1. Access node 204 may comprise signal radii 208 and 210, and access node 206 may comprise signal radius 212.

A signal radius, or coverage radius, may comprise an area around an access node within which a wireless device can detect a signal transmitted form the access node. Signal radii 208 and 210 can comprise radii for reference signals, or pilot signals, transmitted from access node 204 and signal radius 212 can comprise a radius for a reference signal, or pilot signal, transmitted from access node 206.

In operation, wireless device 202 may establish communication with access node 204 such that access node 204 provides the wireless device access to a communication network (such as communication network 108, illustrated in FIG. 1). Access node 204 may transmit a reference signal, or a pilot signal, over signal radius 208 to enable wireless device 202 to detect access node 204. When a wireless device, such as wireless device 202, detects the reference signal from access node 204, and it is determined that the reference signal from access node 204 meets a threshold signal level, wireless device 202 may attempt to establish communication with access node 204. For example, the signal level may be represented by received signal strength indication (RSSI), reference signal received power (RSRP), reference signal received quality (RSRQ), signal to interference plus noise ratio (SINR), or any other suitable metric.

In an embodiment, power boosting may be performed to transmit a reference signal, or pilot signal, from an access node with an increased signal level such that the power boosting increases the quality of service (QoS) experienced by wireless devices in communication with the access node. For example, a reference signal according to the 3GPP LTE protocol may be used for channel estimation and, ultimately, a boost in the reference signal power can be used to improve channel quality. These improved channel conditions lead to a greater ability to satisfy service conditions for the wireless devices in communication with the access node.

In an embodiment, power boosting may be performed at an access node to transmit a signal, such as a reference signal or a pilot signal, from the access node with an increased signal level and, thus, a greater signal radius. For example, power boosting may be performed in a multi-antenna configuration according to the 3GPP LTE protocol. An access node may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna.

In an example where an access node comprises a multi-antenna configuration, when a first antenna is transmitting a reference signal, power options may comprise: using power from a first antenna to transmit the reference signal; using power from a first antenna and a second antenna to transmit the reference signal; using power from a first antenna, a second antenna, and a third antenna to transmit the reference signal; using power from a first antenna, a second antenna, a third antenna, and a fourth antenna to transmit the reference signal, and so on. In an embodiment, a reference signal transmitted without a boosted power (e.g., using power from 1 antenna) may comprise a signal level of 1.5 dB. Accordingly, signal levels for transmitting a reference signal or pilot signal may comprise a signal level of 1.5 dB (power from 1 antenna), 3 dB (power from 2 antennas), 4.5 dB (power from 3 antennas), 6 dB (power from 4 antennas), and so on. Other suitable processes for increasing the transmitted signal level of a reference signal may also be implemented. With reference to FIG. 2, signal radius 208 may comprise a reference signal radius for access node 204 when power boosting is not performed, while signal radius 210 may comprise a reference signal radius for access node 204 when power boosting is performed.

In some scenarios, transmitting a reference signal with an increased power may cause interference with communicating wireless devices. For example, when power boosting is performed and the reference signal radius for an access node is expanded, other signals transmitted from the access node, such as bearer signals, control signals, and any other suitable signals, may not comprise such an expanded radius. This can result in the reference signal radius of an access node being larger than the signal radius for other signals. In this example, a wireless device that detects a reference signal from an access node performing power boosting may be out of range for other signals transmitted by the access node. In addition, the radius for signals transmitted from the wireless device may not be large enough to reach the access node performing power boosting.

In an embodiment, a handover to an access node performing power boosting may be attempted due to an increased reference signal level detected at a wireless device. For example, the wireless device may detect a reference signal from an access node performing power boosting at an increased signal level, and attempt a handover based on the detected signal level. Accordingly, the wireless device may commence a handover process and attempt to communicate with the power boosting access node to complete the handover. The handover may then fail because the wireless device may be out of range to perform the handover to the access node (e.g., signals transmitted from the wireless device may not comprise radii large enough to reach the access node and/or signals other than the reference signal transmitted from the access node may not comprise radii large enough to reach the wireless device).

In another embodiment, a wireless device may not be handed over from an access node performing power boosting based on an increased reference signal level detected at a wireless device. For example, a wireless device may be out of range for signals from the power boosting wireless device other than the reference signal (e.g., bearer signals, control signals, and the like), but the wireless device may not be handed over from the power boosting access node because of the increased reference signal level detected at the wireless device. Accordingly, a handover may be attempted, but the wireless device may already be out of the range necessary to successfully perform the handover, and the handover may therefore fail. These signal mismatches between reference signal radius and other signal radii can result in service interruptions such as dropped calls, lagging or poor quality media streams, or other service interruptions. In an embodiment, an access node that performs power boosting may provide a wireless device a mechanism to compensate for the received reference signal or pilot signal from that access node.

Systems and methods are described for determining an access node for a wireless device. An increased signal level for a first signal and an adjustment value based on the increased signal level may be determined. An indication of the adjustment value and the first signal comprising the increased signal level may be transmitted from a first access node. A wireless device in communication with the first access node may transmit signal information comprising a determined first signal level associated with the first access node and a determined second signal level associated with a second access node, wherein the signal information is transmitted in response to a reporting event triggered at the wireless device based on the adjustment value and at least one of a received signal level for the first signal and a received signal level for the second signal. Based on the signal information, one of the first access node and the second access node may be selected for communication with the wireless device. The wireless device may be instructed to communicate with the selected access node.

Figure 3:
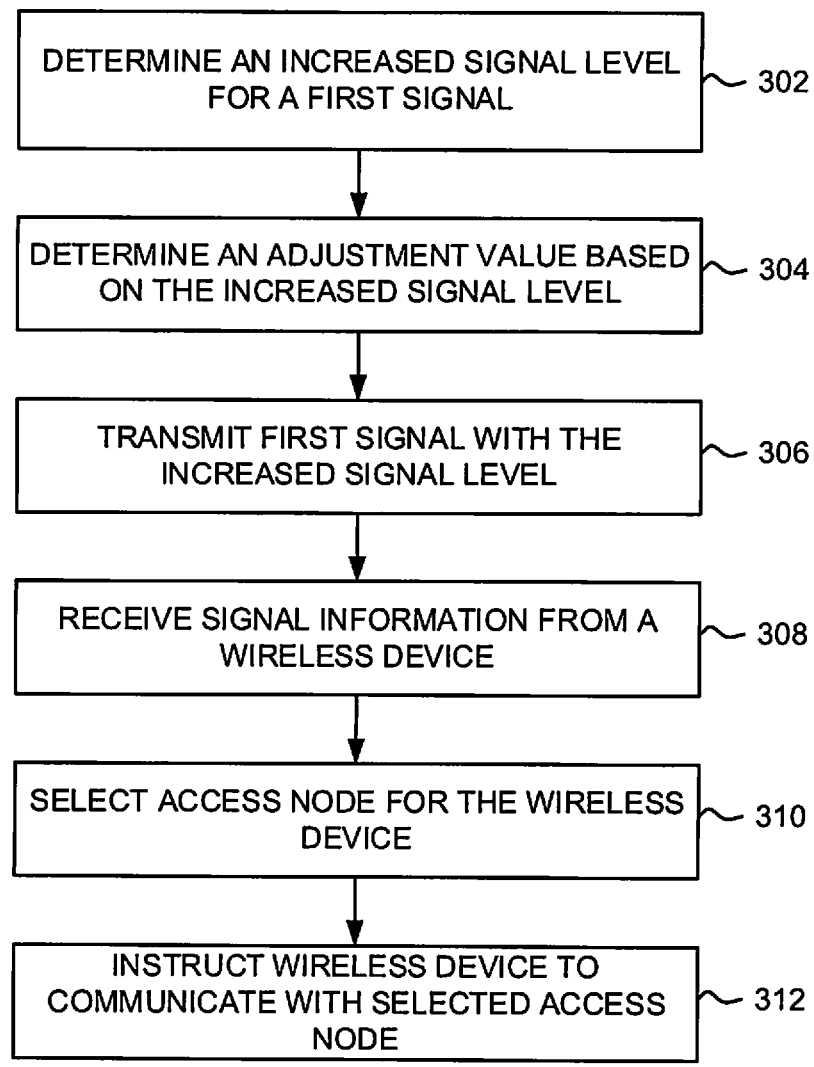
FIG. 3 illustrates an exemplary method of determining an access node for a wireless device.

FIG. 3 illustrates an exemplary method for determining an access node for a wireless device. The method will be discussed with reference to the exemplary communication system 200 illustrated in FIG. 2, however, the method can be implemented with any suitable communication system.

Referring to FIG. 3, at step 302, an increased signal level is determined to transmit a first signal from a first access node. For example, access node 204 may be performing power boosting and an increased signal level for a reference signal or pilot signal may be determined. The increased first signal level may comprise 3 dB, 4.5 dB, 6 dB, or any other suitable level. In an embodiment, signal radius 208 may illustrate the signal radius of a reference signal or pilot signal transmitted without an increased signal level and signal radius 210 may illustrate the signal radius of a reference signal or pilot signal transmitted with an increased signal level.

At step 304, an adjustment value may be determined based on the increased signal level. For example, a reference signal or pilot signal transmitted from access node 204 with an increased signal level (e.g. over signal radius 210) may be received at wireless device 202. Wireless device 202 may attempt a handover based on the received signal, however the attempt may end in failure because of a signal radius mismatch between a signal radius for the reference signal or pilot signal and signal radii for other signals (e.g., bearer signals, control signals, and the like). Accordingly, an adjustment value may be determined such that calculations performed at the wireless device may compensate for the increased signal level.

In an embodiment, the adjustment value may be based on the increased signal level for the reference signal or pilot signal. For example, where a reference signal is transmitted with a 3 dB signal level, an adjustment value may be determined based on the 3 db signal level. Where a reference signal is transmitted with a 4.5 dB signal level, an adjustment value may be determined based on the 4.5 dB signal level.

At step 306, the first signal comprising the increased signal level and an indication of the adjustment value is transmitted from a first access node. For example, access node 204 may be performing power boosting and may transmit a reference signal or pilot signal with an increased signal level. The increased signal level may comprise 3 dB, 4.5 dB, 6 dB, or any other suitable level. Additionally, an indication of the adjustment value may be transmitted from the first access node. For example, the adjustment value may comprise an offset that has been determined based on the increased signal level, and an indication of the determined offset may be transmitted from access node 204.

At step 308, signal information comprising a determined first signal level associated with the first access node and a determined second signal level associated with a second access node is received from a wireless device, wherein the signal information is transmitted from the wireless device in response to a reporting event that is triggered at the wireless device based on the adjustment value and at least one of a received signal level for the first signal and a received signal level for the second signal. For example, wireless device 202 may receive a first signal, such as a reference signal or pilot signal, at a first received signal level from access node 204 and a second signal, such as reference signal or pilot signal, at a second received signal level from access node 206. In addition, the wireless device may receive the indication of the first adjustment value from access node 204.

In an embodiment, a reporting event may be triggered at the wireless device based on the adjustment value and at least one of a received signal level for the first signal and a received signal level for the second signal. A reporting event may comprise an event where a wireless device transmits measurement reports comprising signal information to an access node. For example, the wireless device may transmit a plurality of measurement reports at various time intervals. Determinations may be made at the access node based on the received measurement reports (e.g., instructing the wireless device to perform a handover). In an example, at least one comparison of the received first signal level, the received second signal level, the adjustment value, one or more offsets, and one or more thresholds may be calculated, and a reporting event may be triggered based on the comparison. A measurement report comprising the first signal level and the second signal level may be transmitted and the measurement report may be received by access node 204.

At step 308, based on the signal information, one of the first access node and the second access node may be selected for communication with the wireless device. For example, based on the determined first signal level and the determined second signal level, one of the first access node and the second access node may be selected. At step 310, the wireless device is instructed to communicate with the selected access node. For example, based on the selection from step 308, the wireless device may be instructed to communicate with one of access node 204 and access node 206.

Figure 4:
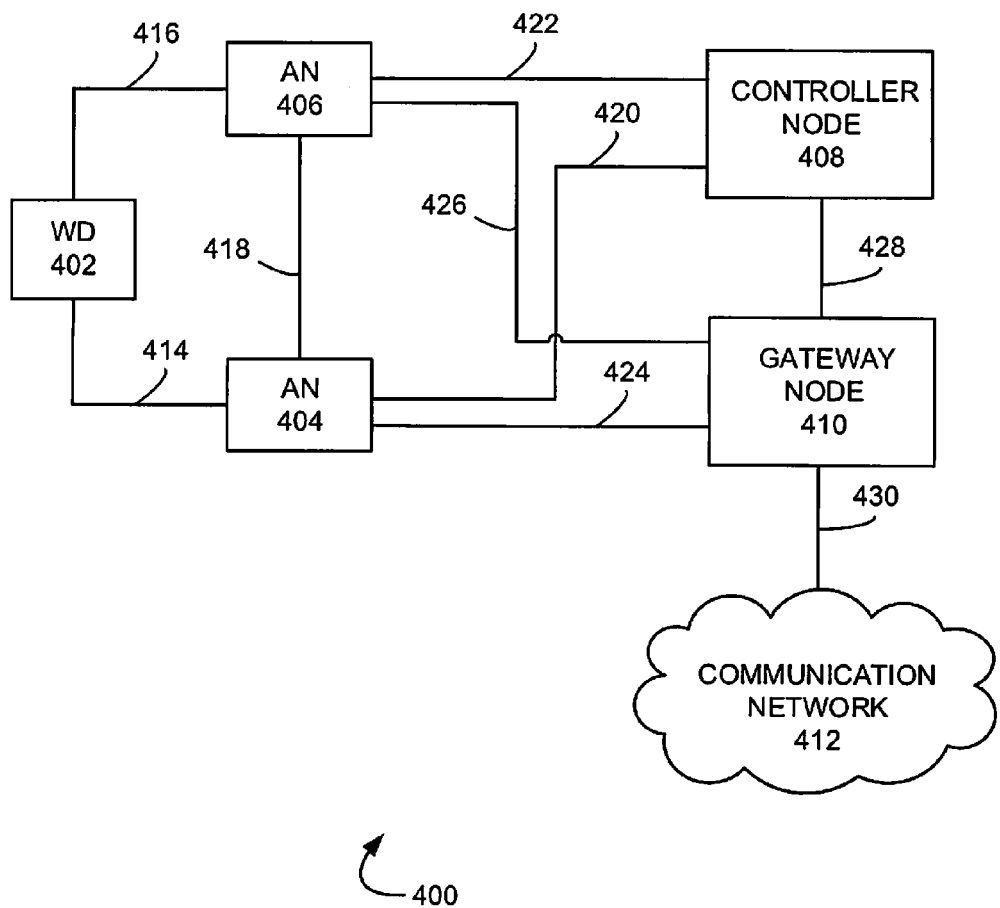
FIG. 4 illustrates another exemplary system to determine an access node for a wireless device.

FIG. 4 illustrates another exemplary communication system 400 to determine a communication access node for a wireless device. Communication system 400 may comprise a wireless device 402, access nodes 406 and 404, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, an eNodeB device, or an enhanced eNodeB device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE), and. Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
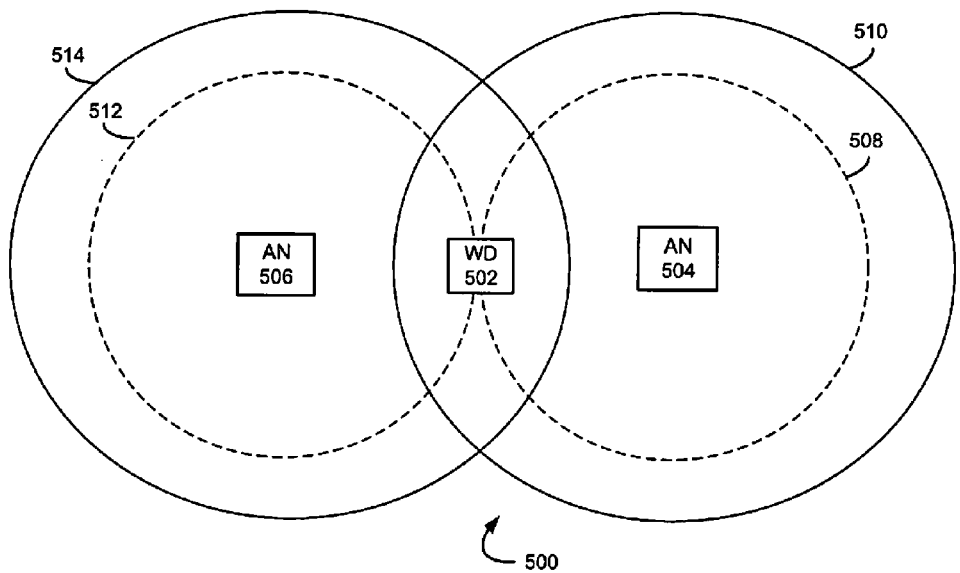
FIG. 5 illustrates another exemplary system to determine an access node for a wireless device.

FIG. 5 illustrates an exemplary communication system 500 for determining an access node for a wireless device. System 500 comprises wireless device 502, access nodes 504 and 506, and signal radii 508, 510, 512 and 514. Wireless device 502 may comprise a device similar to wireless device 402 of FIG. 4. Similarly, access nodes 504 and 506 may comprise access nodes similar to access node 404 of FIG. 4. Access node 504 may comprise signal radii 508 and 510, and access node 506 may comprise signal radii 512 and 514.

In operation, wireless device 502 may establish communication with access node 504 such that access node 504 provides the wireless devices access to a communication network (such as communication network 412, illustrated in FIG. 4). In an embodiment, one or more of access nodes 504 and 506 may perform power boosting, as described herein. For example, access node 504 may transmit a reference signal or pilot signal over signal radius 508 when power boosting is not performed and may transmit the reference signal or pilot signal over signal radius 510 when power boosting is performed. Similarly, access node 506 may transmit a reference signal or pilot signal over signal radius 512 when power boosting is not performed and may transmit the reference signal or pilot signal over signal radius 514 when power boosting is performed.

In some scenarios, transmitting a reference signal with an increased power may cause interference with communicating wireless devices. For example, when power boosting is performed and the reference signal radius for an access node is expanded, other signals transmitted from the access node, such as bearer signals, control signals, and any other suitable signals, may not comprise such an expanded radius. This can result in the reference signal radius of an access node being larger than the signal radius for other signals. In this example, a wireless device that detects a reference signal from an access node performing power boosting may be out of range for other signals transmitted by the access node. In addition, the radius for signals transmitted from the wireless device may not be large enough to reach the access node performing power boosting.

In an embodiment, a handover to an access node performing power boosting may be attempted due to an increased reference signal level detected at a wireless device. For example, the wireless device may detect a reference signal from an access node performing power boosting at an increased signal level, and attempt a handover based on the detected signal level. Accordingly, the wireless device may commence a handover process and attempt to communicate with the power boosting access node to complete the handover. The handover may then fail because the wireless device may be out of range to perform the handover to the access node (e.g., signals transmitted from the wireless device may not comprise radii large enough to reach the access node and/or signals other than the reference signal transmitted from the access node may not comprise radii large enough to reach the wireless device).

In another embodiment, a wireless device may not be handed over from an access node performing power boosting based on an increased reference signal level detected at a wireless device. For example, a wireless device may be out of range for signals from the power boosting wireless device other than the reference signal (e.g., bearer signals, control signals, and the like), but the wireless device may not be handed over from the power boosting access node because of the increased reference signal level detected at the wireless device. Accordingly, a handover may be attempted, but the wireless device may already be out of the range necessary to successfully perform the handover, and the handover may therefore fail. These signal mismatches between reference signal radius and other signal radii can result in service interruptions such as dropped calls, lagging or poor quality media streams, or other service interruptions. In an embodiment, an access node that performs power boosting may provide a wireless device a mechanism to compensate for the received reference signal or pilot level from that access node.

Figure 6:
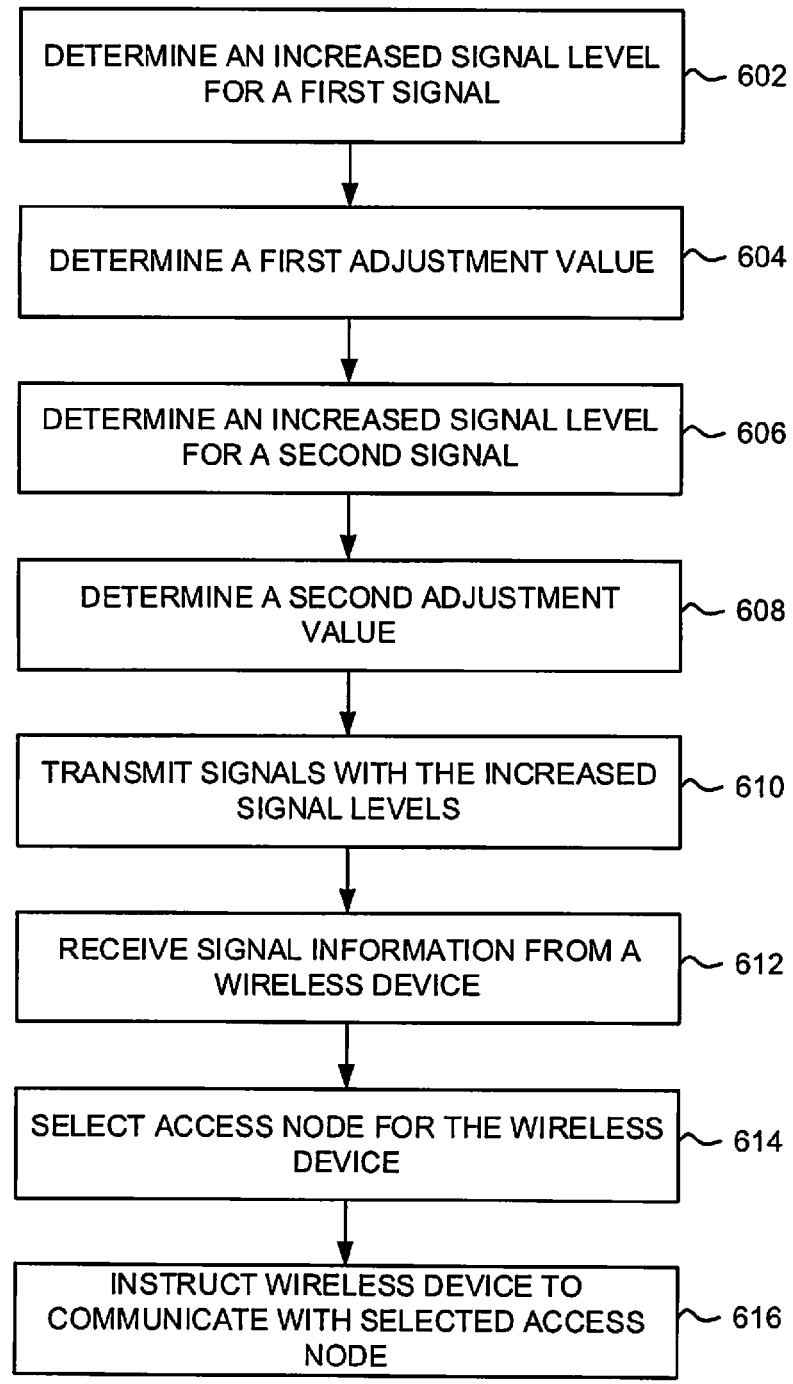
FIG. 6 illustrates another exemplary method of determining an access node for a wireless device.

FIG. 6 illustrates an exemplary method for determining an access node for a wireless device. The method will be discussed with reference to the exemplary communication system 500 illustrated in FIG. 5, however, the method can be implemented with any suitable communication system.

Referring to FIG. 6, at step 602, an increased signal level is determined to transmit a first signal from a first access node. For example, access node 504 may be performing power boosting and an increased signal level for a reference signal or pilot signal may be determined. The increased first signal level may comprise 3 dB, 4.5 dB, 6 dB, or any other suitable level. In an embodiment, signal radius 508 may illustrate the signal radius of a reference signal or pilot signal transmitted without an increased signal level and signal radius 510 may illustrate the signal radius of a reference signal or pilot signal transmitted with an increased signal level.

At step 604, a first adjustment value may be determined based on the increased signal level for the first signal. For example, a reference signal or pilot signal transmitted from access node 504 with an increased signal level (e.g. over signal radius 510) may be received at wireless device 502. Wireless device 502 may attempt a handover based on the received signal, however the attempt may end in failure because of a signal radius mismatch between a signal radius for the reference signal or pilot signal and signal radii for other signals (e.g., bearer signals, control signals, and the like). Accordingly, a first adjustment value may be determined such that calculations performed at the wireless device may compensate for the increased signal level.

In an embodiment, the adjustment value may be based on a determined factor. For example, a first factor may be determined based on the increased signal level (e.g., 3 dB, 4.5 dB, and the like). The determined adjustment value may be calculated using a default adjustment value and the first factor. For instance, the adjustment value may comprise an offset value used for signal level calculations performed at a wireless device in communication with the first access node (e.g. an offset value used in a reporting event trigger calculation). The adjustment value may be determined by modifying the default offset value with the first factor. In an example, the adjustment value may be calculated by subtracting the first factor from the default offset value. In another example, the adjustment value may be calculated by dividing the default offset value by the first factor.

At step 606, an increased signal level is determined to transmit a second signal from a second access node. For example, access node 506 may be performing power boosting and an increased signal level for a reference signal or pilot signal may be determined. The increased second signal level may comprise 3 dB, 4.5 dB, 6 dB, or any other suitable level. In an embodiment, signal radius 512 may illustrate the signal radius of a reference signal or pilot signal transmitted without an increased signal level and signal radius 514 may illustrate the signal radius of a reference signal or pilot signal transmitted with an increased signal level.

At step 608, a second adjustment value may be determined based on the increased signal level for the second signal. For example, a reference signal or pilot signal transmitted from access node 506 with an increased signal level (e.g. over signal radius 514) may be received at wireless device 502. Wireless device 502 may attempt a handover based on the received signal, however the attempt may end in failure because of a signal radius mismatch between a signal radius for the reference signal or pilot signal and signal radii for other signals (e.g., bearer signals, control signals, and the like). Accordingly, a second adjustment value may be determined such that calculations performed at the wireless device may compensate for the increased signal level. The second adjustment value may be determined similar to the manner the first adjustment value is determined at step 604.

At step 610, the first signal comprising the increased signal level, an indication of the first adjustment value, the second signal comprising the increased signal level, and an indication of the second adjustment value are transmitted. For example, access node 504 may be performing power boosting and may transmit a reference signal or pilot signal with an increased signal level and an indication of the first adjustment value. In an embodiment, access node 506 may also be performing power boosting and may transmit a reference signal or pilot signal with an increased signal level and an indication of the second adjustment value.

At step 612, signal information comprising a determined first signal level associated with the first access node and a determined second signal level associated with a second access node is received from a wireless device, wherein the signal information is transmitted from the wireless device in response to a reporting event that is triggered at the wireless device based on the first adjustment value and at least one of a received signal level for the first signal and a received signal level for the second signal. For example, wireless device 502 may receive a first signal, such as a reference signal or pilot signal, at a first received signal level from access node 504, a first adjustment value from access node 504, a second signal, such as reference signal or pilot signal, at a second received signal level from access node 506, and a second adjustment value from access node 506.

In an embodiment, a reporting event may be triggered at the wireless device based on at least one of the first adjustment value and the second adjustment value. A reporting event may comprise an event at a wireless device that, when triggered, causes the wireless device to transmit measurement reports comprising signal information to an access node during the duration of the event. For example, the wireless device may transmit a plurality of measurement reports at various time intervals. Decisions may be made at the access node (or another network element) based on the received measurement reports (e.g., instructing the wireless device to perform a handover). The reporting event may be started based on a first trigger (e.g., a start trigger) and may be ended based on a second trigger (e.g., an end trigger). For example, a comparison of at least two of the received first signal level, the received second signal level, the first adjustment value, the second adjustment value, one or more offsets, and one or more thresholds may be calculated, and a reporting event may be triggered based on the comparison. In an embodiment, a measurement report comprising the first signal level and the second signal level may be transmitted from wireless device 502 and the measurement report may be received by access node 504.

At step 614, based on the signal information, one of the first access node and the second access node may be selected for communication with the wireless device. For example, based on the determined first signal level and the determined second signal level, one of the first access node and the second access node may be selected. The selection may be based on a comparison of the signal levels from the signal information, or any other suitable selection process. At step 616, the wireless device is instructed to communicate with the selected access node. For example, based on the selection from step 608, the wireless device may be instructed to communicate with one of access node 504 and access node 506. The selected access node may provide the wireless device access to a communication network. In an embodiment, wireless device 502 may be instructed to communicate with one of access node 504 and access node 506 as a part of a cell selection or a cell reselection process.

Figure 7:
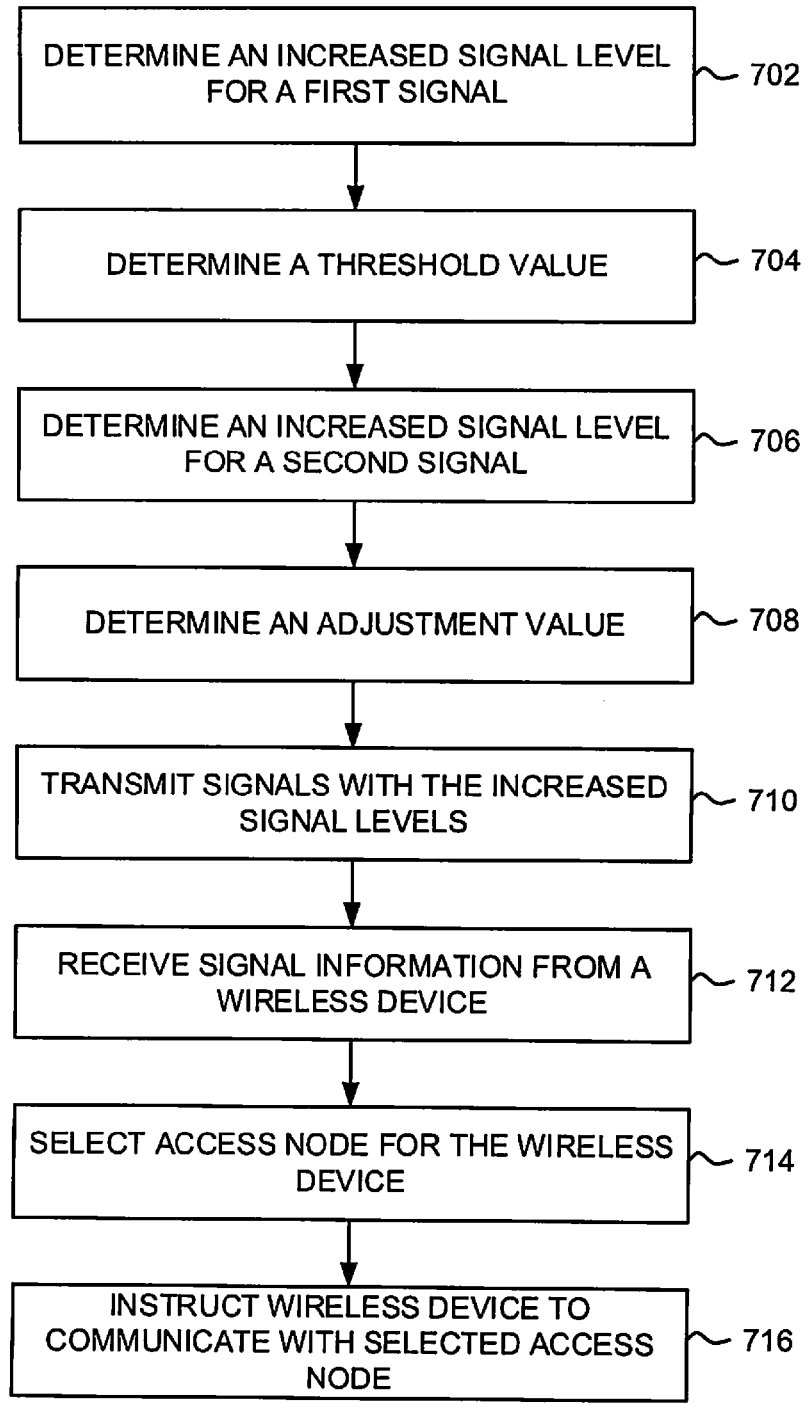
FIG. 7 illustrates an exemplary method of determining an access node for a wireless device.

FIG. 7 illustrates an exemplary method for determining an access node for a wireless device. The method will be discussed with reference to the exemplary communication system 500 illustrated in FIG. 5, however, the method can be implemented with any suitable communication system.

Referring to FIG. 7, at step 702, an increased signal level is determined to transmit a first signal from a first access node. For example, access node 504 may be performing power boosting and an increased signal level for a reference signal or pilot signal may be determined. The increased first signal level may comprise 3 dB, 4.5 dB, 6 dB, or any other suitable level. In an embodiment, signal radius 508 may illustrate the signal radius of a reference signal or pilot signal transmitted without an increased signal level and signal radius 510 may illustrate the signal radius of a reference signal or pilot signal transmitted with an increased signal level.

At step 704, a first adjustment value may be determined based on the increased signal level for the first signal. For example, a reference signal or pilot signal transmitted from access node 504 with an increased signal level (e.g. over signal radius 510) may be received at wireless device 502. Wireless device 502 may attempt a handover based on the received signal, however the attempt may end in failure because of a signal radius mismatch between a signal radius for the reference signal or pilot signal and signal radii for other signals (e.g., bearer signals, control signals, and the like). Accordingly, a first adjustment value may be determined such that calculations performed at the wireless device may compensate for the increased signal level.

In an embodiment, the adjustment value may be based on a determined factor. For example, a first factor may be determined based on the increased signal level (e.g., 3 dB, 4.5 dB, and the like). The determined adjustment value may be calculated using a default adjustment value and the first factor. For instance, the adjustment value may comprise threshold value used for signal level calculations performed at a wireless device in communication with the first access node (e.g. a threshold value used in a reporting event trigger calculation). The adjustment value may be determined by modifying the default threshold value with the first factor. In an example, the adjustment value may be calculated by subtracting the first factor from the default threshold value. In another example, the adjustment value may be calculated by dividing the default threshold value by the first factor.

At step 706, an increased signal level is determined to transmit a second signal from a second access node. For example, access node 506 may be performing power boosting and an increased signal level for a reference signal or pilot signal may be determined. The increased second signal level may comprise 3 dB, 4.5 dB, 6 dB, or any other suitable level. In an embodiment, signal radius 512 may illustrate the signal radius of a reference signal or pilot signal transmitted without an increased signal level and signal radius 514 may illustrate the signal radius of a reference signal or pilot signal transmitted with an increased signal level.

At step 708, a second adjustment value may be determined based on the increased signal level for the second signal. For example, a reference signal or pilot signal transmitted from access node 506 with an increased signal level (e.g. over signal radius 514) may be received at wireless device 502. Wireless device 502 may attempt a handover based on the received signal, however the attempt may end in failure because of a signal radius mismatch between a signal radius for the reference signal or pilot signal and signal radii for other signals (e.g., bearer signals, control signals, and the like). Accordingly, a second adjustment value may be determined such that calculations performed at the wireless device may compensate for the increased signal level. The second adjustment value may be determined similar to the manner the first adjustment value is determined at step 604.

In an embodiment, the second adjustment value may be based on a determined second factor. For example, a second factor may be determined based on the increased signal level (e.g., 3 dB, 4.5 dB, and the like). The determined second adjustment value may be calculated using a default adjustment value and the second factor. For instance, the second adjustment value may comprise an offset value used for signal level calculations performed at a wireless device in communication with the second access node (e.g. an offset value used in a reporting event trigger calculation). The second adjustment value may be determined by modifying the default offset value with the second factor. In an example, the adjustment value may be calculated by subtracting the second factor from the default offset value. In another example, the adjustment value may be calculated by dividing the default offset value by the second factor.

At step 710, the first signal comprising the increased signal level, an indication of the first adjustment value, the second signal comprising the increased signal level, and an indication of the second adjustment value are transmitted. For example, access node 504 may be performing power boosting and may transmit a reference signal or pilot signal with an increased signal level and an indication of the first adjustment value. In an embodiment, access node 506 may also be performing power boosting and may transmit a reference signal or pilot signal with an increased signal level and an indication of the second adjustment value.

At step 712, signal information comprising a determined first signal level associated with the first access node and a determined second signal level associated with a second access node is received from a wireless device, wherein the signal information is transmitted from the wireless device in response to a reporting event that is triggered at the wireless device based on the first adjustment value and at least one of a received signal level for the first signal and a received signal level for the second signal. For example, wireless device 502 may receive a first signal, such as a reference signal or pilot signal, at a first received signal level from access node 504, a first adjustment value from access node 504, a second signal, such as reference signal or pilot signal, at a second received signal level from access node 506, and a second adjustment value from access node 506.

In an embodiment, a reporting event may be triggered at the wireless device based on at least one of the first adjustment value and the second adjustment value. For example, a comparison of at least two of the received first signal level, the received second signal level, the first adjustment value, the second adjustment value, one or more offsets, and one or more thresholds may be calculated, and a reporting event may be triggered based on the comparison. In an embodiment, a measurement report comprising the first signal level and the second signal level may be transmitted from wireless device 502 and the measurement report may be received by access node 504.

At step 714, based on the signal information, one of the first access node and the second access node may be selected for communication with the wireless device. For example, based on the determined first signal level and the determined second signal level, one of the first access node and the second access node may be selected. The selection may be based on a comparison of the signal levels from the signal information, or any other suitable selection process. At step 716, the wireless device is instructed to communicate with the selected access node. For example, based on the selection from step 708, the wireless device may be instructed to communicate with one of access node 504 and access node 506. The selected access node may provide the wireless device access to a communication network. In an embodiment, wireless device 502 may be instructed to communicate with one of access node 504 and access node 506 as a part of a cell selection or a cell reselection process.

With reference to FIGS. 6 and 7, a reporting event may be triggered based on two or more of the first signal level received at the wireless device, the second signal level received at the wireless device, the first adjustment value, and the second adjustment value. For example, an access node may receive signal information from a wireless device (e.g., at steps 612 and 712) based on a trigger reporting event.

In an embodiment, the first adjustment value may comprise an adjusted threshold and a triggered reporting event may comprise an A1 event. Here, the first signal level received at the wireless device minus a hysteresis may be compared to the first adjustment value. This can be expressed as First_Signal−$Hys_{A1}$>$AdjThresh_{A1}$, where First_Signal=First Signal Level, $Hys_{A1}$=Hysteresis for an A1 event, and $AdjThresh_{A1}$=Adjusted Threshold for an A1 event (i.e. the first adjustment value). The reporting event may be triggered when the first signal level minus the hysteresis is greater than the first adjustment value.

In an embodiment, the first adjustment value may comprise an adjusted threshold and a triggered reporting event may comprise an A2 event. Here, the first signal level plus the hysteresis may be compared to the first adjustment value. This can be expressed as First_Signal+$Hys_{A2}$<$AdjThresh_{A2}$, where First_Signal=First Signal Level, $Hys_{A2}$=Hysteresis for an A2 event, and $AdjThresh_{A2}$=Adjusted Threshold for an A2 event (i.e. the first adjustment value). The reporting event may be triggered when the first signal level plus a hysteresis is less than the first adjustment value.

In an embodiment, the first adjustment value may comprise an adjusted offset, the second adjustment value may comprise an adjusted offset, and a triggered reporting event may comprise an A3 event. Here, the second signal level minus a hysteresis plus the second adjustment value may be compared to the first signal level plus the first adjustment value. This can be expressed as Second_Signal−$Hys_{A3}$+$Adj_{Second}Offset_{A3}$>First_Signal+$Adj_{First}Offset_{A3}$, where First_Signal=First Signal Level, $Hys_{A3}$=Hysteresis for an A3 event, $Adj_{First}Offset_{A3}$=Adjusted Offset for an A3 event (i.e. the first adjustment value), Second_Signal=Second Signal Level, and $Adj_{Second}Offset_{A3}$=Adjusted Offset for an A3 event (i.e. the second adjustment value). The reporting event may be triggered when the second signal level minus the hysteresis plus the second adjustment factor is greater than the first signal level plus the first adjustment factor.

In an embodiment, the second adjustment value may comprise an adjusted threshold and a triggered reporting event may comprise an A4 event. Here, the second signal level plus offsets minus a hysteresis may be compared to the second adjustment value. This can be expressed as Second_Signal+$Offsets_{A4}$−$Hys_{A4}$>$AdjThresh_{A4}$, where Second_Signal=Second Signal Level, $Hys_{A4}$=Hysteresis for an A4 event, $Offsets_{A4}$=Offsets for an A4 event, and $AdjThresh_{A4}$=Adjusted Threshold for an A4 event (i.e. the second adjustment value). The reporting event may be triggered when the second signal level plus the offsets minus the hysteresis is greater than the second adjustment value. The $Offsets_{A4}$ may comprise one or more of a frequency specific offset for an access node or a cell, a cell specific offset for an access node or a cell, or any other suitable offset.

In an embodiment, the second adjustment value may comprise an adjusted offset value and a triggered reporting event may comprise an A4 event. Here, the second signal level plus the second adjustment value minus a hysteresis may be compared to a threshold. This can be expressed as Second_Signal+AdjOffset$_{A4}$−Hys$_{A4}$>Thresh$_{A4}$, where Second_Signal=Second Signal Level, Hys$_{A4}$=Hysteresis for an A4 event, AdjOffset$_{A4}$=Adjusted Offset for an A4 event (i.e. the second adjustment value), and Thresh$_{A4}$=Threshold for an A4 event. The reporting event may be triggered when the second signal level plus the second adjustment value minus the hysteresis is greater than the threshold.

In an embodiment, a triggered reporting event may comprise a B1 event. Here, the B1 event may be implemented similar to an A4 event, where the Second_Signal comprises a second signal from an Inter-Radio Access Technology (RAT), and the hysteresis, offsets, and thresholds may comprise B1 event values and/or inter-RAT values. For example, the second adjustment value may comprise an adjusted B1 event threshold value or an adjusted B1 event offset value.

In an embodiment, the first adjustment value may comprise an adjusted threshold, the second adjustment value may comprise an adjusted threshold, and a triggered reporting event may comprise an A5 event. Here, the first signal level plus a hysteresis may be compared to the first adjustment value and the second signal level plus offsets minus a hysteresis may be compared to the second adjustment value. This can be expressed as First_Signal+First_Hys$_{A5}$<AdjFirst_Thresh$_{A5}$ AND Second_Signal+Offsets$_{A5}$−Second_Hys$_{A5}$>AdjSecond_Thresh$_{A5}$, where First_Signal=First Signal Level, First_Hys$_{A5}$=First Hysteresis for an A5 event, AdjFirst_Thresh$_{A5}$=Adjusted First Threshold for an A5 event (i.e., first adjustment value), Second_Signal=Second Signal Level, Second_Hys$_{A5}$=Second Hysteresis for an A5 event, Offsets$_{A5}$=Offsets for an A5 event, and AdjSecond_Thresh$_{A5}$=Adjusted Second Threshold for an A5 event (i.e., second adjustment value). The reporting event may be triggered when the first signal level plus the first hysteresis is less than the first adjustment value and the second signal level plus the offsets minus the second hysteresis is greater than the second adjustment value. The Offsets$_{A5}$ may comprise one or more of a frequency specific offset for an access node or a cell, a cell specific offset for an access node or a cell, or any other suitable offset. The Offsets$_{A5}$ added to the First_Signal may comprise the same offsets, different offsets, or a subset of the offsets added to the Second_Signal.

In an embodiment, the first adjustment value may comprise an adjusted threshold, the second adjustment value may comprise an adjusted offset, and a triggered reporting event may comprise an A5 event. Here, the first signal level plus a hysteresis may be compared to the first adjustment value and the second signal level plus the second adjustment value minus a hysteresis may be compared to a threshold. This can be expressed as First_Signal+First_Hys$_{A5}$<AdjFirst_Thresh$_{A5}$ AND Second_Signal+AdjOffset$_{A5}$−Second_Hys$_{A5}$>Second_Thresh$_{A5}$, where First_Signal=First Signal Level, First_Hys$_{A5}$=First Hysteresis for an A5 event, AdjFirst_Thresh$_{A5}$=Adjusted First Threshold for an A5 event (i.e., first adjustment value), Second_Signal=Second Signal Level, Second_Hys$_{A5}$=Second Hysteresis for an A5 event, AdjOffset$_{A5}$=Adjusted Offset for an A5 event (i.e., second adjustment value), and Second_Thresh$_{A5}$=Second Threshold for an A5 event. The reporting event may be triggered when the first signal level plus the first hysteresis is less than the first adjustment value and the second signal level plus the second adjustment value minus the second hysteresis is greater than the threshold.

In an embodiment, a triggered reporting event may comprise a B2 event. Here, the B2 event may be implemented similar to an A5 event, where the Second_Signal comprises a second signal from an Inter-Radio Access Technology (RAT), and the hysteresis, offsets, and thresholds may comprise B2 event values and/or inter-RAT values. For example, the second adjustment value may comprise an adjusted B2 event threshold value or an adjusted B2 event offset value.

In an embodiment, the first adjustment value may comprise an adjusted offset, the second adjustment value may comprise an adjusted offset, and a triggered reporting event may comprise an A6 event. Here, the second signal level minus a hysteresis plus the second adjustment value may be compared to the first signal level plus the first adjustment value. This can be expressed as Second_Signal−Hys$_{A6}$+Adj$_{second}$Offset$_{A6}$>First_Signal$_{comp}$+Adj$_{First}$Offset$_{A6}$, where First_Signal=First Signal Level, Hys$_{A6}$=Hysteresis for an A6 event, Adj$_{First}$Offset$_{A6}$=Adjusted Offset for an A6 event (i.e., first adjustment value), Second_Signal=Second Signal Level, and Adj$_{second}$Offset$_{A6}$=Adjusted Offset for an A6 event (i.e., second adjustment value). The reporting event may be triggered when the second signal level minus the hysteresis plus the second adjustment value is greater than the first signal level plus the first adjustment value.

Figure 8:
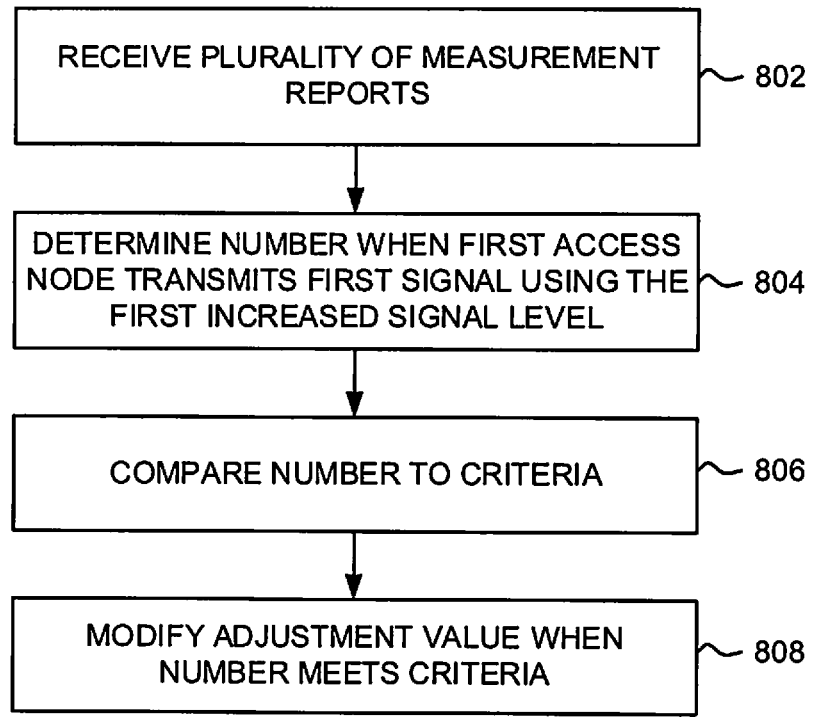
FIG. 8 illustrates another exemplary method of determining an adjustment value.

FIG. 8 illustrates an exemplary method for determining an access node for a wireless device. For example, the method of FIG. 8 and may be used in combination with the methods of FIGS. 6 and 7. The method will be discussed with reference to the exemplary communication system 500 illustrated in FIG. 5, however, the method can be implemented with any suitable communication system.

Referring to FIG. 8, at step 802, a plurality of measurement reports are received at the first access node. For example, access node 504 may be performing power boosting and may transmit a reference signal or pilot signal with an increased signal level. Wireless devices in communication with access node 504 may receive the first signal and a measurement event may be triggered at one of the wireless devices based on at least one of received first signal, a received second signal, and an adjustment value. Wireless devices in communication with access node 504 that comprise a triggered measurement event may transmit measurement reports to the first access node. In an embodiment, each received measurement report may be associated with a reporting event.

At step 804, a number is determined when the first access node transmits the first signal using the increased signal level. While the first signal is transmitted using the increased first signal level, a number, such as a number of handovers from access node 504, may be determined. In an example, received measurement reports may each be associated with a reporting event. The number of handovers may comprise a ratio of a number of reporting events triggered at wireless devices in communication with access node 504 to the number of handovers.

In an embodiment, while the first signal is transmitted using the increased first signal level, a number, such as a number of failed handovers from access node 504, may be determined. The number of failed handovers may comprise a ratio of a number of reporting events triggered at wireless devices in communication with access node 504 to the number of failed handovers.

At step 806, the determined number is compared to a criteria. For example, where the determined number comprises a number of handovers, the number may be compared to a handover criteria. Where the determined number comprises a number of failed handovers, the number may be compared to a failed handover criteria. The criteria may be a threshold and may further comprise an absolute number, a percentage, or any other suitable criteria.

A step 808, the first adjustment factor is modified when the determined number meets the criteria. For example, where a number of reporting events per the determined number of handovers meets a handover criteria, the first adjustment value may be modified. The determination that the number of reporting events per the determined number of handovers meets a handover criteria (e.g. the determined number is above a threshold) may indicate that the first adjustment value is being used at wireless devices to trigger too many or too few reporting events. Accordingly, the first adjustment value may be modified. An example where a number of reporting events per the determined number of failed handovers meets a failed handover criteria may be implemented in a similar manner.

Figure 9:
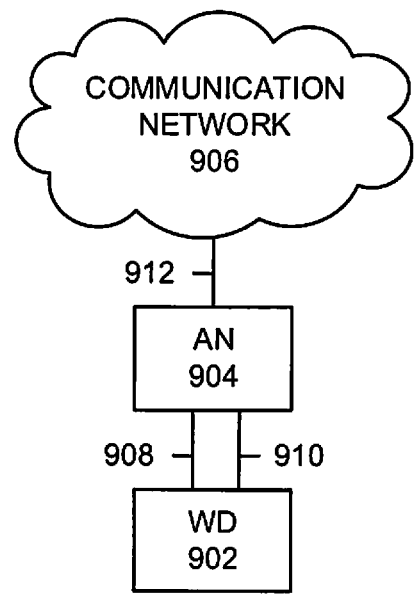
FIG. 9 illustrates another exemplary system to determine an access node for a wireless device.
Figure 9:

FIG. 9 illustrates an exemplary communication system 900 to determine an access node for a wireless device comprising wireless devices 902, access node 904, communication network 906, and communication links 908, 910, and 912. Other network elements may be present in the communication system 900 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 904 and communication network 906 which are omitted for clarity, including additional processing nodes, routers, gateways, and physical and/or wireless data links for carrying data among the various network elements.

Wireless device 902 can be any device configured to communicate over communication system 900 using a wireless communication link. For example, wireless device 902 can include a cell phone, a smart phone, a computing platform such as a laptop, palmtop, or a tablet, a personal digital assistant, or an internet access device, and combinations thereof. It is noted that while one wireless device is illustrated in FIG. 9 as being in communication with each of access node 904, any number of wireless devices can be implemented.

Access nodes 904 is a network node capable of providing wireless communications to wireless device 902, and can be, for example, a base transceiver station, a radio base station, an eNodeB device, or an enhanced eNodeB device. Access node 804 may communicate with communication network 906 over communication link 912. In an embodiment, access node 904 can comprise a serving access node for wireless device 902.

Communication network 906 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 906 can be capable of carrying voice information and other information, for example, to support communications by a wireless device such as wireless device 902. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE. Wired network protocols that may be utilized by communication network 906 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 906 may also comprise a wireless network, including base stations, wireless communication nodes, telephony switches, internet routers, network gateways, computer systems, communication links, or some other type of communication equipment, and combinations thereof.

Communication links 908, 910, and 912 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, wireless device 902 may communicate with access node 904 over at least two frequency bands. For example, wireless device 902 may communicate with access node 904 using a first frequency band over communication link 908 and a second frequency band over communication link 910. In this example, the first and second frequency bands may comprise varying signal radii, and wireless device 902 may be instructed to communicate with access node 904 over one of the first frequency band and the second frequency band based on, for example, a location of the wireless device. In an embodiment where wireless device 902 communicates with access node 904 over communication link 908 using the first frequency band, access node 904 may instruct wireless device 902 to change to communicating with access node 904 over communication link 910 using the second frequency band.

Figure 10:
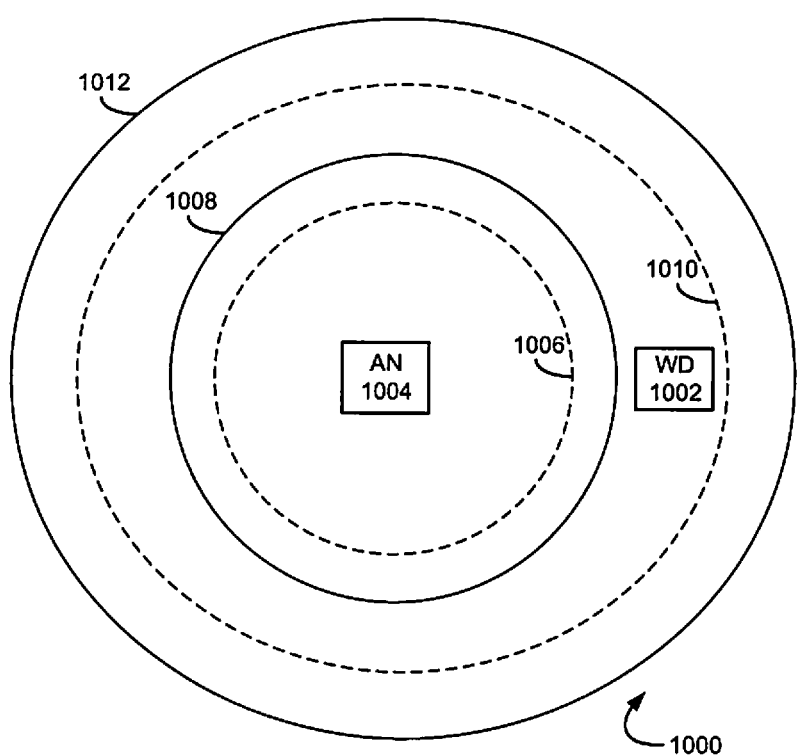
FIG. 10 illustrates another exemplary system to determine an access node for a wireless device.

FIG. 10 illustrates an exemplary communication system 1000 for determining an access node for a wireless device. System 1000 comprises wireless device 1002, and access node 1004. Wireless device 1002 may comprise a device similar to wireless device 902 of FIG. 9. Similarly, access node 1004 may comprise an access node similar to access node 904 of FIG. 9. Access node 1004 may comprise signal radii 1006, 1008, 1010 and 1012.

In operation, wireless device 1002 may establish communication with access node 1004 such that access node 1004 provides the wireless devices access to a communication network. Access node 1004 may transmit a plurality of references signals or pilot signals over a plurality of frequency bands. For example, access node 1004 may transmit a first reference signal or pilot signal over a first frequency band and a second reference signal or pilot signal over a second frequency band. In an embodiment, access node 1004 may perform power boosting, as described herein. For example, access node 1004 may transmit a first reference signal or pilot signal using a first frequency band over signal radius 1006 when power boosting is not performed and may transmit the reference signal or pilot signal using the first frequency band over signal radius 1008 when power boosting is performed. Additionally, access node 1004 may transmit a second reference signal or pilot signal using a second frequency band over signal radius 1010 when power boosting is not performed and may transmit the reference signal or pilot signal using the second frequency band over signal radius 1012 when power boosting is performed. In an embodiment, power boosting may be performed for a reference signal transmitted over only the first frequency band, only the second frequency band, or a combination of these.

In some scenarios, transmitting a reference signal over a first frequency band with an increased power may cause interference with communicating wireless devices. For example, when power boosting is performed and the reference signal radius transmitted over a first frequency band is expanded, other signals transmitted from the access node over the first frequency band, such as bearer signals, control signals, and any other suitable signals, may not comprise such an expanded radius. This can result in the reference signal radius for the first frequency band being larger than the signal radius for other signals over the first frequency band. In this example, a wireless device that detects a power boosted reference signal over the first frequency band may be out of range for other signals transmitted over the first frequency band.

In an embodiment, a handover to an access node performing power boosting may be attempted due to an increased reference signal level detected at a wireless device. For example, the wireless device may detect a reference signal transmitted over a first frequency band at an increased signal level, and attempt a handover based on the detected signal level. This attempted handover may fail because of the discrepancy in signal radii described above. In another embodiment, a wireless device may not be handed over from a first frequency band based on an increased reference signal level detected at the wireless device. For example, the wireless device may be out of range for signals from the power boosting wireless device other than the reference signal (e.g., bearer signals, control signals, and the like), but the wireless device may not be handed over from the first frequency band because of the increased reference signal level detected at the wireless device. Accordingly, a handover may be attempted, but the wireless device may already be out of the range necessary to successfully perform the handover, and the handover may therefore fail. These signal mismatches between reference signal radius and other signal radii can result in service interruptions such as dropped calls, lagging or poor quality media streams, or other service interruptions. In an embodiment, an access node that performs power boosting may provide a wireless device a mechanism to compensate for the received reference signal or pilot signal from that access node.

Figure 11:
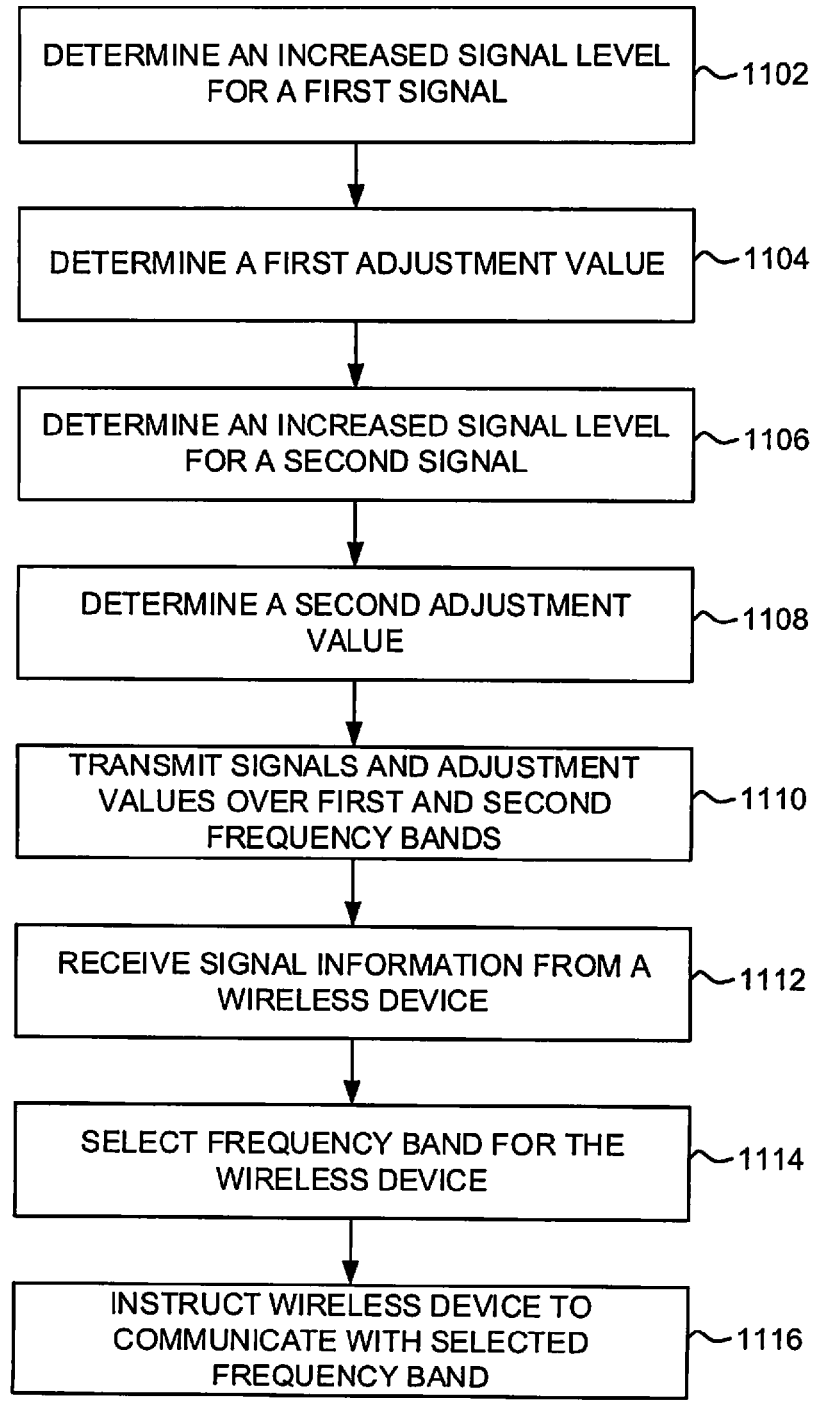
FIG. 11 illustrates another exemplary method of determining an access node for a wireless device.

FIG. 11 illustrates an exemplary method for determining an access node for a wireless device. The method will be discussed with reference to the exemplary communication system 1000 illustrated in FIG. 10, however, the method can be implemented with any suitable communication system.

Referring to FIG. 11, at step 1102, an increased signal level is determined to transmit a first signal from a first access node over a first frequency band. For example, access node 1004 may be performing power boosting and an increased signal level for a reference signal or pilot signal may be determined. The increased first signal level may comprise 3 dB, 4.5 dB, 6 dB, or any other suitable level. In an embodiment, signal radius 1006 may illustrate the signal radius of a reference signal or pilot signal transmitted without an increased signal level and signal radius 1008 may illustrate the signal radius of a reference signal or pilot signal transmitted with an increased signal level.

At step 1104, a first adjustment value may be determined based on the increased signal level for the first signal. For example, a reference signal or pilot signal transmitted from access node 1004 with an increased signal level (e.g. over signal radius 510) may be received at wireless device 1002. Wireless device 1002 may attempt a handover based on the received signal, however the attempt may end in failure because of a signal radius mismatch between a signal radius for the reference signal or pilot signal and signal radii for other signals (e.g., bearer signals, control signals, and the like). Accordingly, a first adjustment value may be determined such that calculations performed at the wireless device may compensate for the increased signal level.

In an embodiment, the adjustment value may be based on a determined factor. For example, a first factor may be determined based on the increased signal level (e.g., 3 dB, 4.5 dB, and the like). The determined adjustment value may be calculated using a default adjustment value and the first factor. In an embodiment, the first adjustment value may comprise an offset value or a threshold value, as described with reference to FIGS. 6 and 7 herein.

At step 1106, an increased signal level is determined to transmit a second signal from the first access node over a second frequency band. For example, access node 1004 may be performing power boosting and an increased signal level for a reference signal or pilot signal may be determined. The increased second signal level may comprise 3 dB, 4.5 dB, 6 dB, or any other suitable level. In an embodiment, signal radius 1010 may illustrate the signal radius of a reference signal or pilot signal transmitted without an increased signal level and signal radius 1012 may illustrate the signal radius of a reference signal or pilot signal transmitted with an increased signal level.

At step 1108, a second adjustment value may be determined based on the increased signal level for the second signal. For example, a reference signal or pilot signal transmitted from access node 1004 with an increased signal level (e.g. over signal radius 514) may be received at wireless device 1002. Wireless device 1002 may attempt a handover based on the received signal, however the attempt may end in failure because of a signal radius mismatch between a signal radius for the reference signal or pilot signal and signal radii for other signals (e.g., bearer signals, control signals, and the like). Accordingly, a second adjustment value may be determined such that calculations performed at the wireless device may compensate for the increased signal level. In an embodiment, the first adjustment value may comprise an offset value or a threshold value, as described with reference to FIGS. 6 and 7 herein.

At step 1110, the first signal comprising the increased signal level and an indication of the first adjustment value are transmitting over the first frequency band, the second signal comprising the increased signal level and an indication of the second adjustment value are transmitted over the second frequency band. For example, access node 1004 may be performing power boosting and may transmit a first reference signal or pilot signal with an increased signal level and an indication of the first adjustment value over the first frequency band and a second reference signal or pilot signal with an increased signal level and an indication of the second adjustment value over the second frequency band.

At step 1112, signal information comprising a determined first signal level associated with the first frequency band and a determined second signal level associated with a second frequency band is received from a wireless device, wherein the signal information is transmitted from the wireless device in response to a reporting event that is triggered at the wireless device based on the first adjustment value and at least one of a received signal level for the first signal and a received signal level for the second signal. For example, wireless device 1002 may receive, from access node 1003, a first signal over a first frequency band at a first received signal level, a first adjustment value over the first frequency band, a second signal over a second frequency band at a second received signal level, and a second adjustment value over the second frequency band.

In an embodiment, a reporting event may be triggered at the wireless device based on at least one of the first adjustment value and the second adjustment value. For example, a comparison of at least two of the received first signal level, the received second signal level, the first adjustment value, the second adjustment value, one or more offsets, and one or more thresholds may be calculated, and a reporting event may be triggered based on the comparison. In an embodiment, a measurement report comprising the first signal level and the second signal level may be transmitted from wireless device 1002 and the measurement report may be received by access node 1004.

At step 1114, based on the signal information, one of the first frequency band and the second frequency band may be selected for communication with the wireless device. For example, based on the determined first signal level and the determined second signal level, one of the first frequency band and second frequency band may be selected. The selection may be based on a comparison of the signal levels from the signal information, or any other suitable selection process. At step 1116, the wireless device is instructed to communicate over the selected frequency band. For example, based on the selection from step 1108, wireless device 1002 may be instructed to communicate over the first frequency band or the second frequency band with access node 1004. The access node may provide the wireless device access to a communication network using communications over the selected frequency band. In an embodiment, wireless device 1002 may be instructed to communicate over one of the first frequency band or the second frequency band as a part of a cell selection or a cell reselection process.

In an embodiment, the method of FIG. 8 may be used in combination with the method of FIG. 11. The method will be discussed with reference to the exemplary communication system 1000 illustrated in FIG. 10, however, the method can be implemented with any suitable communication system.

Referring to FIG. 8, at step 802, a plurality of measurement reports are received at the first access node. For example, access node 1004 may be performing power boosting and may transmit a reference signal or pilot signal with an increased signal level. Wireless devices in communication with access node 1004 may receive the first signal and a measurement event may be triggered at one of the wireless devices based on at least one of received first signal, a received second signal, and an adjustment value. Wireless devices in communication with access node 1004 that comprise a triggered measurement event may transmit measurement reports to the first access node. In an embodiment, each received measurement report may be associated with a reporting event.

At step 804, a number is determined when the first access node transmits the first signal over the first frequency band using the increased signal level. While the first signal is transmitted over the first frequency band using the increased first signal level, a number, such as a number of handovers from the first frequency band of access node 1004, may be determined. In an example, received measurement reports may each be associated with a reporting event. The number of handovers may comprise a ratio of a number of reporting events triggered at wireless devices in communication with access node 1004 over the first frequency band to the number of handovers.

In an embodiment, while the first signal is transmitted over the first frequency band using the increased first signal level, a number, such as a number of failed handovers from the first frequency band of access node 1004, may be determined. The number of failed handovers may comprise a ratio of a number of reporting events triggered at wireless devices in communication with access node 1004 over the first frequency band to the number of failed handovers.

At step 806, the determined number is compared to a criteria. For example, where the determined number comprises a number of handovers, the number may be compared to a handover criteria. Where the determined number comprises a number of failed handovers, the number may be compared to a failed handover criteria. The criteria may be a threshold and may further comprise an absolute number, a percentage, or any other suitable criteria.

A step 808, the first adjustment factor is modified when the determined number meets the criteria. For example, where a number of reporting events per the determined number of handovers meets a handover criteria, the first adjustment value may be modified. The determination that the number of reporting events per the determined number of handovers meets a handover criteria (e.g. the determined number is above a threshold) may indicate that the first adjustment value is being used at wireless devices to trigger too many or too few reporting events. Accordingly, the first adjustment value may be modified. An example where a number of reporting events per the determined number of failed handovers meets a failed handover criteria may be implemented in a similar manner.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 12:
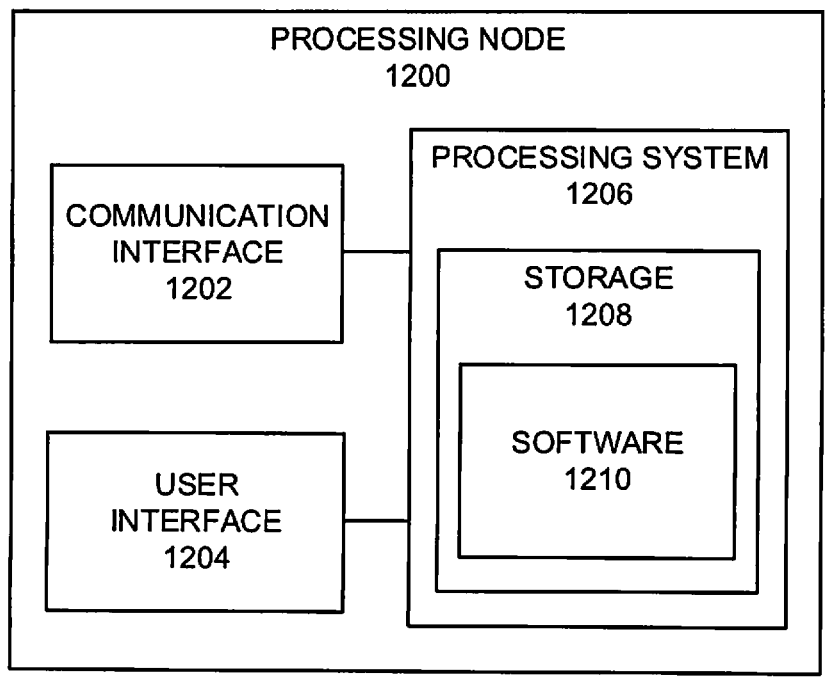
FIG. 12 illustrates an exemplary processing node.

FIG. 12 illustrates an exemplary processing node 1200 in a communication system. Processing node 1200 comprises communication interface 1202, user interface 1204, and processing system 1206 in communication with communication interface 1202 and user interface 1204. Processing node 1200 can be configured to determine a communication access node for a wireless device. Processing system 1206 includes storage 1208, which can comprise a disk drive, flash drive, memory circuitry, or other memory device. Storage 1208 can store software 1210 which is used in the operation of the processing node 1200. Storage 1208 may include a disk drive, flash drive, data storage circuitry, or some other memory apparatus. Software 1210 may include computer programs, firmware, or some other form of machine-readable instructions, including an operating system, utilities, drivers, network interfaces, applications, or some other type of software. Processing system 1206 may include a microprocessor and other circuitry to retrieve and execute software 1210 from storage 1208. Processing node 1200 may further include other components such as a power management unit, a control interface unit, etc., which are omitted for clarity. Communication interface 1202 permits processing node 1200 to communicate with other network elements. User interface 1204 permits the configuration and control of the operation of processing node 1200.

Examples of processing node 1200 include controller node 408 and gateway node 410. Processing node 1200 can also be an adjunct or component of a network element, such as an element of access nodes 104, 106, 404, 406, or 904. Processing node 1200 can also be another network element in a communication system. Further, the functionality of processing node 1200 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining an access node for a wireless device, the method comprising:
   determining, at a first access node or a controller node, an increased signal level to transmit a first signal from the first access node;
   determining, at the first access node or the controller node, an adjustment value based on the increased signal level;
   transmitting from the first access node an indication of the adjustment value and the first signal comprising the increased signal level, wherein the first signal comprises a reference signal;
   receiving, from a wireless device in communication with the first access node, signal information comprising a determined first signal level associated with the first access node and a determined second signal level associated with a second access node, wherein the signal information is transmitted from the wireless device in response to a reporting event that is triggered at the wireless device based on the adjustment value and at least one of a received signal level for the first signal and a received signal level for the second signal;
   selecting, based on the signal information, one of the first access node and the second access node for communication with the wireless device; and
   instructing the wireless device to communicate with the selected access node.

2. The method of claim 1, wherein determining the adjustment value further comprises:
   calculating a factor based on the increased signal level; and
   determining the adjustment value by dividing a first default adjustment value by the factor.

3. The method of claim 1, wherein determining the adjustment value further comprises:
   calculating a factor based on the increased signal level; and
   determining the adjustment value by subtracting the factor from a first default adjustment value.

4. The method of claim 1, wherein the reporting event is triggered at the wireless device based on a comparison between a first threshold and a sum of the received signal level for the first signal and the adjustment value.

5. The method of claim 1, further comprising:
   determining a second increased signal level to transmit a second signal;
   determining a second adjustment value based on the second increased signal level; and
   receiving, from the wireless device in communication with the first access node, signal information comprising the determined first signal level associated with the first access node and the determined second signal level associated with the second access node, wherein the signal information is transmitted from the wireless device in response to a reporting event that is triggered based on the adjustment value, the second adjustment value, and at least one of the received signal level for the first signal and the received signal level for the second signal.

6. The method of claim 5, wherein the reporting event is triggered at the wireless device based on a comparison between a sum of the received signal level for the first signal and the adjustment value and a sum of the received signal level for the second signal and the second adjustment value.

7. The method of claim 5, wherein the reporting event is triggered at the wireless device based on a comparison between a sum of the received signal level for the first signal and the adjustment value minus a hysteresis and a sum of the received signal level for the second signal and the second adjustment value plus a determined offset.

8. The method of claim 1, further comprising:
   receiving at the first access node a plurality of measurement reports each from at least one of the wireless device and a plurality of second wireless devices, wherein each received measurement report is associated with a reporting event triggered at the wireless device that transmitted the measurement report;
   calculating a number of handovers performed based on measurement reports received while the first access node transmits the first signal; and
   modifying the adjustment value when the number of handovers meets a handover criteria.

9. The method of claim 8, wherein the number of handovers comprises a ratio of a number of reporting events to a number of performed handovers.

10. The method of claim 8, wherein the number of handovers comprises a ratio of a number of reporting events to a number of failed handovers.

11. A method for determining an access node for a wireless device, the method comprising:
determining, at a first access node or a controller node, an increased signal level to transmit a first signal from the first access node;
determining, at the first access node or the controller node, a threshold value based on the increased signal level;
transmitting from the first access node an indication of the threshold value and the first signal comprising the increased signal level, wherein the first signal comprises a reference signal;
receiving, from a wireless device in communication with the first access node, signal information comprising a determined first signal level associated with the first access node and a determined second signal level associated with a second access node, wherein the signal information is transmitted from the wireless device in response to a reporting event that is triggered at the wireless device based on the threshold value and at least one of the received signal level for the first signal and the received signal level for the second signal;
selecting, based on the signal information, one of the first access node and the second access node for communication with the wireless device; and
instructing the wireless device to communicate with the selected access node.

12. The method of claim 11, wherein determining the threshold value further comprises:
calculating a factor based on the increased signal level; and
determining the threshold value by dividing a first default threshold value by the factor.

13. The method of claim 11, wherein determining the threshold value further comprises:
calculating a factor based on the increased signal level; and
determining the threshold value by subtracting the factor from a first default threshold value.

14. The method of claim 1, wherein the reporting event is triggered at the wireless device based on a comparison between the threshold value and a sum of the detected signal level for the first signal and a hysteresis.

15. The method of claim 11, further comprising:
determining a second increased signal level to transmit a second signal;
determining an adjustment value based on the second increased signal level; and
receiving, from the wireless device in communication with the first access node, signal information comprising the first determined signal level associated with the first access node and the second determined signal level associated with the second access node, wherein the signal information is transmitted from the wireless device in response to a reporting event that is triggered based on the threshold value, the adjustment value, and at least one of the received signal level for the first signal and the received signal level for the second signal.

16. The method of claim 15, wherein the reporting event is triggered at the wireless device based on a first comparison between the threshold value and a sum of the detected signal level for the first signal and a hysteresis, and a second comparison between a second threshold value and a sum of the detected signal level for the second signal and the adjustment value.

17. The method of claim 1, further comprising:
receiving at the first access node a plurality of measurement reports each from at least one of the wireless device and a plurality of second wireless devices, wherein each received measurement report is associated with a reporting event triggered at the wireless device that transmitted the measurement report;
calculating a number of handovers performed based on measurement reports received while the first access node transmits the first signal; and
modifying the threshold value when the number of handovers meets a handover criteria.

18. The method of claim 8, wherein the number of handovers comprises a ratio of a number of reporting events to a number of performed handovers.

19. A method for determining a frequency band for a wireless device, the method comprising:
determining, at a first access node or a controller node, an increased signal level to transmit a first signal from a first access node over a first frequency band;
determining, at the first access node or the controller node, an adjustment value based on the increased signal level;
transmitting from the first access node an indication of the adjustment value and the first signal comprising the increased signal level over a first frequency band, wherein the first signal comprises a reference signal;
transmitting from the first access node a second signal comprising a second signal level from the first access node over a second frequency band;
receiving, from a wireless device in communication with the first access node, signal information comprising a first determined signal level associated with the first signal and a second determined signal level associated with the second signal, wherein the signal information is transmitted from the wireless device in response to a reporting event that is triggered based on the adjustment value and at least one of a received signal level for the first signal and a received signal level for the second signal;
selecting, based on the first signal information, one of the first frequency band and the second frequency band for communication with the wireless device; and
instructing the wireless device to communicate over the selected frequency band.

20. The method of claim 19, further comprising:
receiving at the first access node a plurality of measurement reports each from at least one of the wireless device and a plurality of second wireless devices, wherein each received measurement report is associated with a reporting event triggered at the wireless device that transmitted the measurement report;
calculating a number of handovers performed based on measurement reports received while the first access node transmits the first signal; and
modifying the adjustment value when the number of handovers meets a handover criteria.

* * * * *